(12) United States Patent  
Hu

(10) Patent No.: US 8,117,142 B2  
(45) Date of Patent: *Feb. 14, 2012

(54) METHOD OF REAL-TIME CRYSTAL PEAK TRACKING FOR POSITRON EMISSION TOMOGRAPHY (PET) AVALANCHE-PHOTODIODES (APD) DETECTOR

(75) Inventor: Dongming Hu, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 716 days.

This patent is subject to a terminal disclaimer.

(21) Appl. No.: 12/245,802

(22) Filed: Oct. 6, 2008

(65) Prior Publication Data

US 2009/0094180 A1 Apr. 9, 2009

Related U.S. Application Data

(60) Provisional application No. 60/977,451, filed on Oct. 4, 2007.

(51) Int. Cl.  
*G06E 1/00* (2006.01)  
*G06E 3/00* (2006.01)  
*G06F 15/18* (2006.01)  
*G06G 7/00* (2006.01)

(52) U.S. Cl. ............... 706/16; 706/12; 706/15; 706/17; 706/18

(58) Field of Classification Search ........................ None  
See application file for complete search history.

(56) References Cited

U.S. PATENT DOCUMENTS

| | | | |
|---|---|---|---|
| 3,798,370 A | 3/1974 | Hurst | |
| 5,519,224 A * | 5/1996 | Mattern | 250/369 |
| 6,307,203 B1 | 10/2001 | Stearns et al. | |
| 6,337,481 B1 | 1/2002 | Stearns et al. | |
| 7,301,144 B2 * | 11/2007 | Williams et al. | 250/252.1 |
| 7,515,304 B2 | 4/2009 | Ito et al. | |
| 7,827,129 B2 * | 11/2010 | Hu et al. | 706/25 |
| 2003/0055799 A1 * | 3/2003 | Starzyk | 706/27 |
| 2005/0151084 A1 * | 7/2005 | Zibulevsky et al. | 250/363.03 |
| 2006/0138315 A1 * | 6/2006 | Williams et al. | 250/252.1 |
| 2006/0209066 A1 | 9/2006 | Kubara et al. | |

OTHER PUBLICATIONS

Jeong et al., "Performance Improvement of Small Gamma Camera Using NaI(TI)Plate and Position Sensitive Photo-Multiplier Tubes", Phys. Med. Biol., 2004, pp. 4961-4970, vol. 49, IOP Publishing Ltd.  
Honkela, Timo, "Description of Kohonen's Self-Organizing Map", excerpt from "Self-Organizing Maps in Natural Language Processing", Jan. 1998, pp. 1-8.  
Honkela, Timo, "Self-Organizing Maps in Natural Language Processing", Dec. 2007, pp. 1-63.  
Demuth, Howard and Beale, Mark, "Neural Network Toolbox for Use with MathLab—User's Guide, Version 3.0", Jan. 1998, pp. 7-1 to 7-34, The Mathworks, Inc.

* cited by examiner

*Primary Examiner* — Omar Fernandez Rivas  
(74) *Attorney, Agent, or Firm* — Peter L. Kendall

(57) ABSTRACT

The present invention provides a method of real-time crystal peak tracking for avalanche-photodiode (APD) detectors on positron emission tomography (PET) scanners that satisfies the need to compensate for the significant gain drifting due to thermal variations in APD detectors on PET scanners.

11 Claims, 9 Drawing Sheets

METHOD OF REAL-TIME CRYSTAL PEAK TRACKING FOR POSITRON EMISSION TOMOGRAPHY (PET) AVALANCHE-PHOTODIODES (APD) DETECTOR

CROSS-REFERENCES TO RELATED APPLICATIONS

This application claims benefit under 35 U.S.C. §119(e) to U.S. Provisional Patent Application Ser. No. 60/977,451 filed on Oct. 4, 2007.

BACKGROUND OF THE INVENTION

1. Field of the Invention

The present invention generally relates to nuclear medicine, and to systems for obtaining nuclear medicine images. In particular, the present invention relates to a method of real-time crystal peak tracking for positron emission tomography (PET) avalanche-photodiodes (APD) detectors.

2. Description of the Related Art

Avalanche-photodiodes (APD) detectors on positron emission tomography (PET) scanners suffer significant gain drifting due to thermal variations. The gain drifting causes crystal peak shifting in position profile. These disadvantages are not admitted to have been known in the art by inclusion in this section. However, for the foregoing reasons, there is a need for a method to compensate for gain drifting due to thermal variations.

BRIEF SUMMARY OF THE INVENTION

The present invention is directed to a method of real-time crystal peak tracking for APD detectors that satisfies the need to compensate for the significant gain drifting due to thermal variations in APD detectors on PET scanners. In particular, the present invention utilizes the neural network based self-organized feature map (SOFM), and increases the tolerance of APD detectors to the thermal changes.

BRIEF DESCRIPTION OF THE DRAWINGS

These and other features, aspects, and advantages of the present invention will become better understood with reference to the following description and appended claims, and accompanying drawings where:

Figure 1:
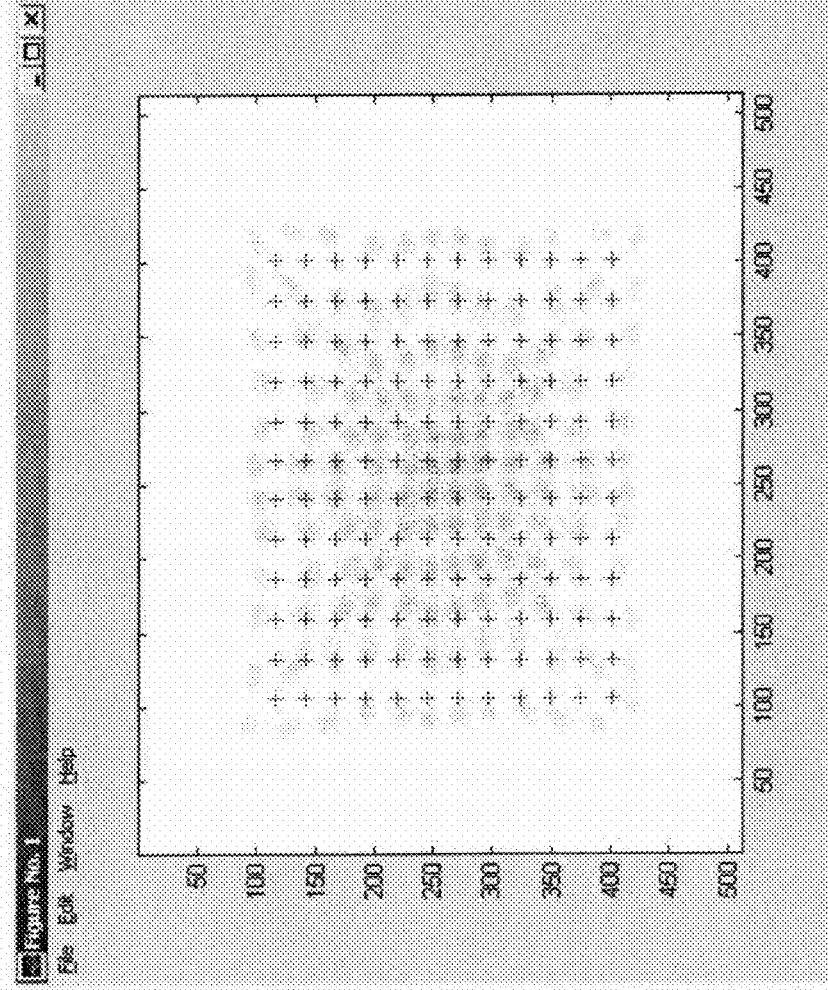
FIG. 1: shows a initial positions of neurons on an APD detector.

The figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk or the like). Similarly, the programs may be stand alone programs, may be incorporated as subroutines in an operating system, may be functions in an installed imagining software package, and the like.

It should be understood that the various embodiments are not limited to the arrangements and instrumentality shown in the drawings.

DETAILED DESCRIPTION OF THE INVENTION

The present invention may be understood more readily by reference to the following detailed description of preferred embodiments of the invention as well as to the examples included therein.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

APD detectors on PET scanners suffer significant gain drifting due to thermal variations. The gain drifting causes crystal peak shifting in position profile. The present invention relates to methods of real-time crystal peak tracking for APD detectors, which preferably compensate for the thermal variations. Methods according to the present invention preferably increase the tolerance of APD detectors to thermal changes. Methods according to the present invention preferably make extended usage of the neural network based self-organizing feature map (SOFM) for building crystal lookup tables on PET detectors coupled with photomultiplier tubes (PMTs) and Avalanche-photodiodes (APDs).

Figure 4:
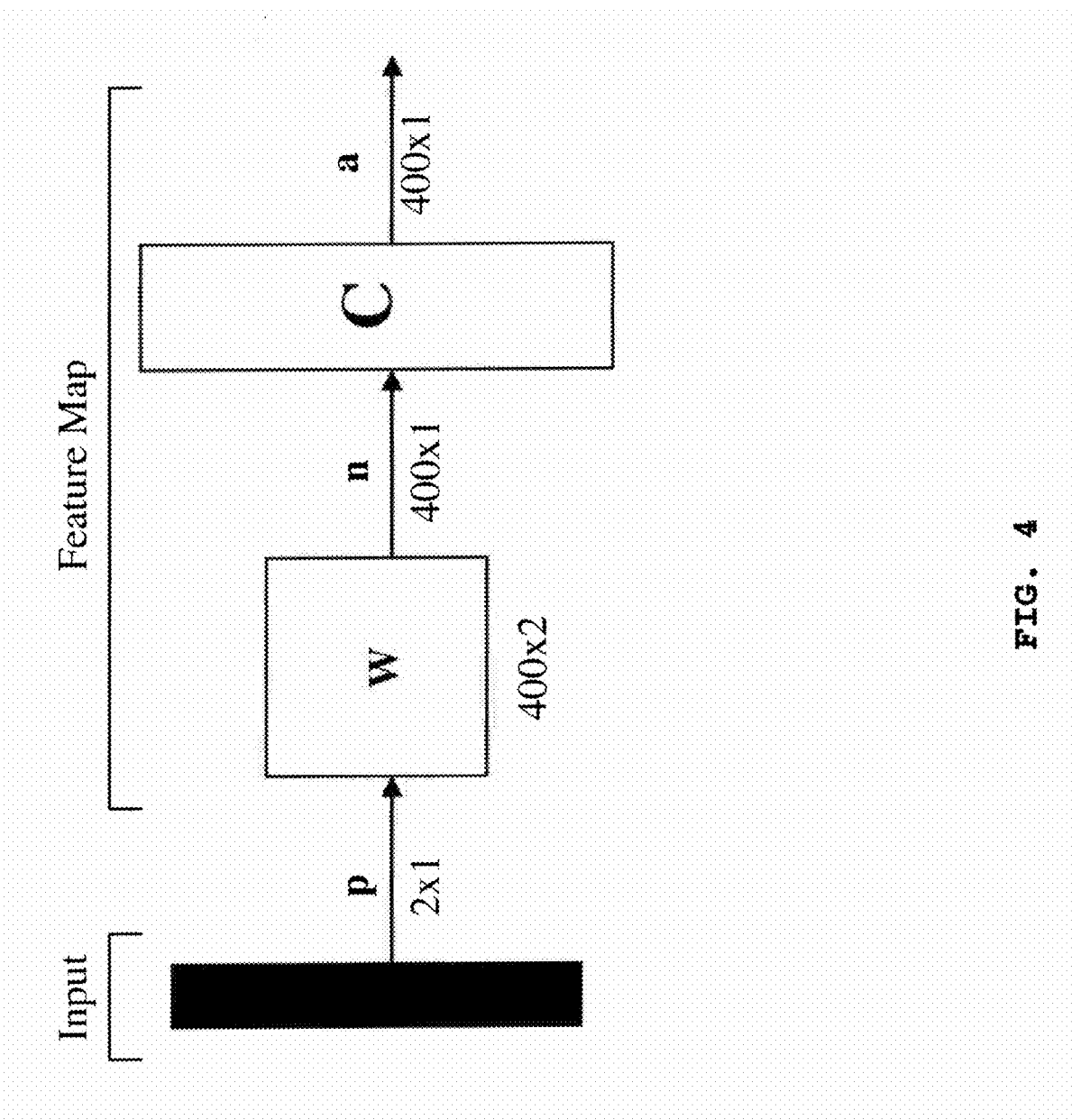
FIG. 4: shows a diagrammatic illustration of the structure of a self-organizing feature map in accordance with the invention.

A block position profile from which a crystal lookup table (CLT) is built contains millions of events, randomly detected by all pixels in a detector block. Therefore, use of a supervised neural network approach is not practical; however, a self-organizing (unsupervised) neural network scheme can solve the problem effectively. In particular, as illustrated in FIG. 4, Kohonen's self-organizing feature map (SOFM), which is a competitive neural network that contains a weight vector matrix (neurons) and a competitive layer, is used.

In particular, the SOFM first determines the "winning" neuron a from n using the competitive layer equation $$a = \text{compet}(Wp),$$

where p is a 2×1 input vector from the detector position profile and W is a weight matrix representing neuron positions. For an exemplary detector, e.g., a 20×20 block detector as used in the Siemens INVEON Dedicated PET scanner, there are 400 neurons representing the locations of each of the "pixels" of the detector block; accordingly, W is a 400×2 matrix (400 pixels, with X and Y positions of each). Vector a is the output from the competitive layer indicating the winning neuron. In the normalized case, Wp can be regarded as the distance between p and neurons weight vectors W. Vector a is the output from the competitive layer indicating the winning neuron. Only the neuron with the closest weight vector to p "wins" the competition each time.

Next, the weight vectors for all neurons within a certain neighborhood (e.g., a neighborhood of 1) for the winning neuron are updated using the Kohonen rule, $$w(q)=(1-\alpha)w(q-1)+\alpha p(q)$$

where $\alpha$ is a learning rate, q is the training index number, and w is the neuron in the neighborhood of the winning neuron (which has the same dimension of p).

When a vector p is presented, the weight of the winning neuron will move toward p. As a result, after many presentations of p from the position profile, the neuron will have learned the vectors that cluster together, which indicates a pixel location in the position profile. After training, the positions of the neurons in the weight matrix will represent the positions of the detector pixels. Thereafter, the crystal lookup table can be constructed easily from the pixel locations represented by the neurons.

Figure 5:
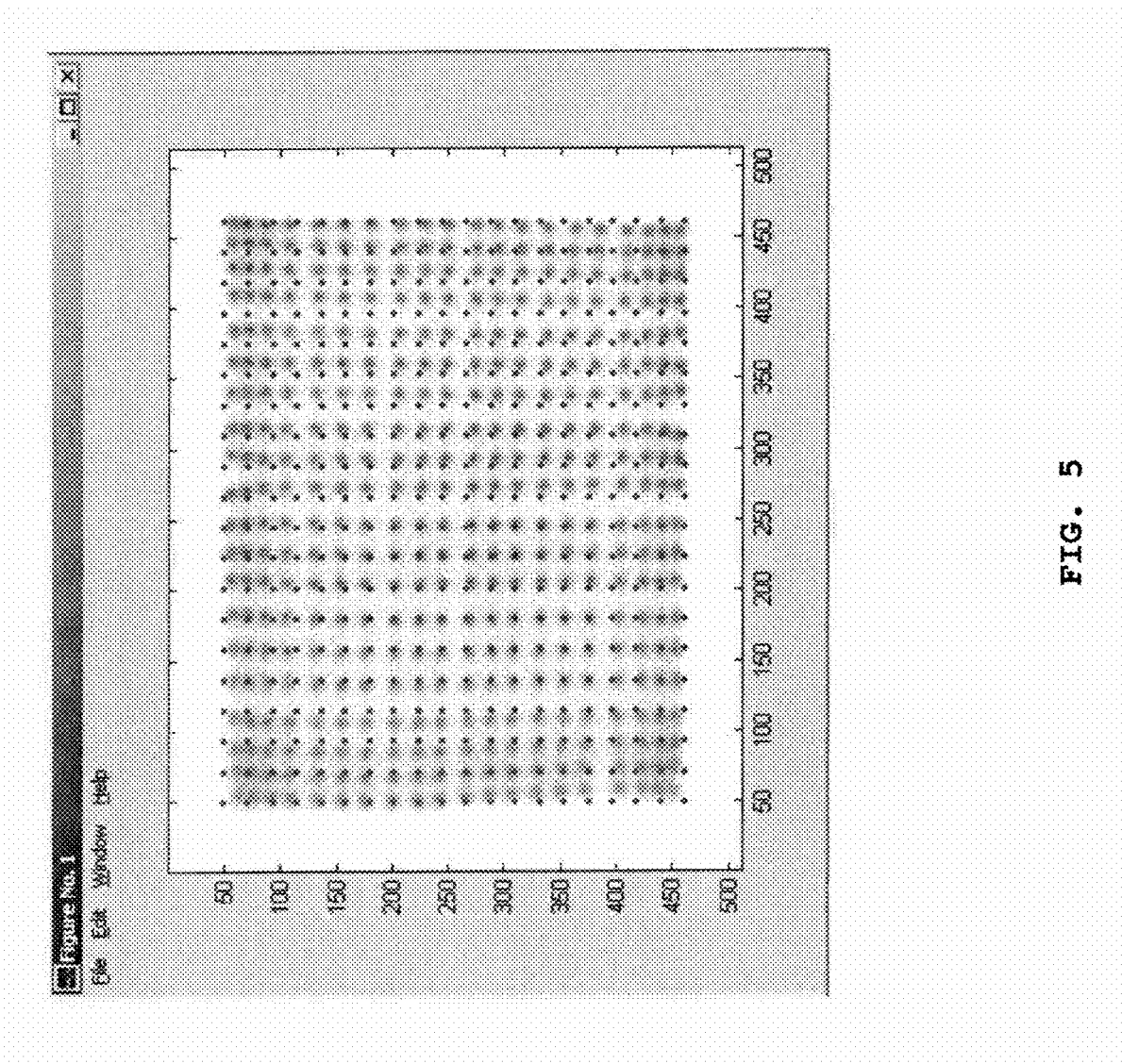
FIG. 5: shows a position profile and initial position of neurons.

By way of example of implementation of the method of the invention, the SOFM training may by simulated by a Math-Lab program. The 400 (exemplary) neurons are evenly (randomly) distributed in the area of interest as initial weight vectors. FIG. 5 illustrates a detector position profile and the neurons' initial positions (round dots). The position profile is then histogrammed from a list mode file that records the sequence of all events, randomly detected by all pixels of the detector with a wide open energy window. Reading the (X, Y) position of an event sequentially from the list mode file as an input vector ensures that a training vector is randomly picked up from the position profile. In an exemplary simulation, three million events are used as training vectors; thus, the weight matrix is updated three million times. In preferred embodiments, the training algorithm may be modified and the learning rate varied over time to achieve better training solutions.

Figure 6:
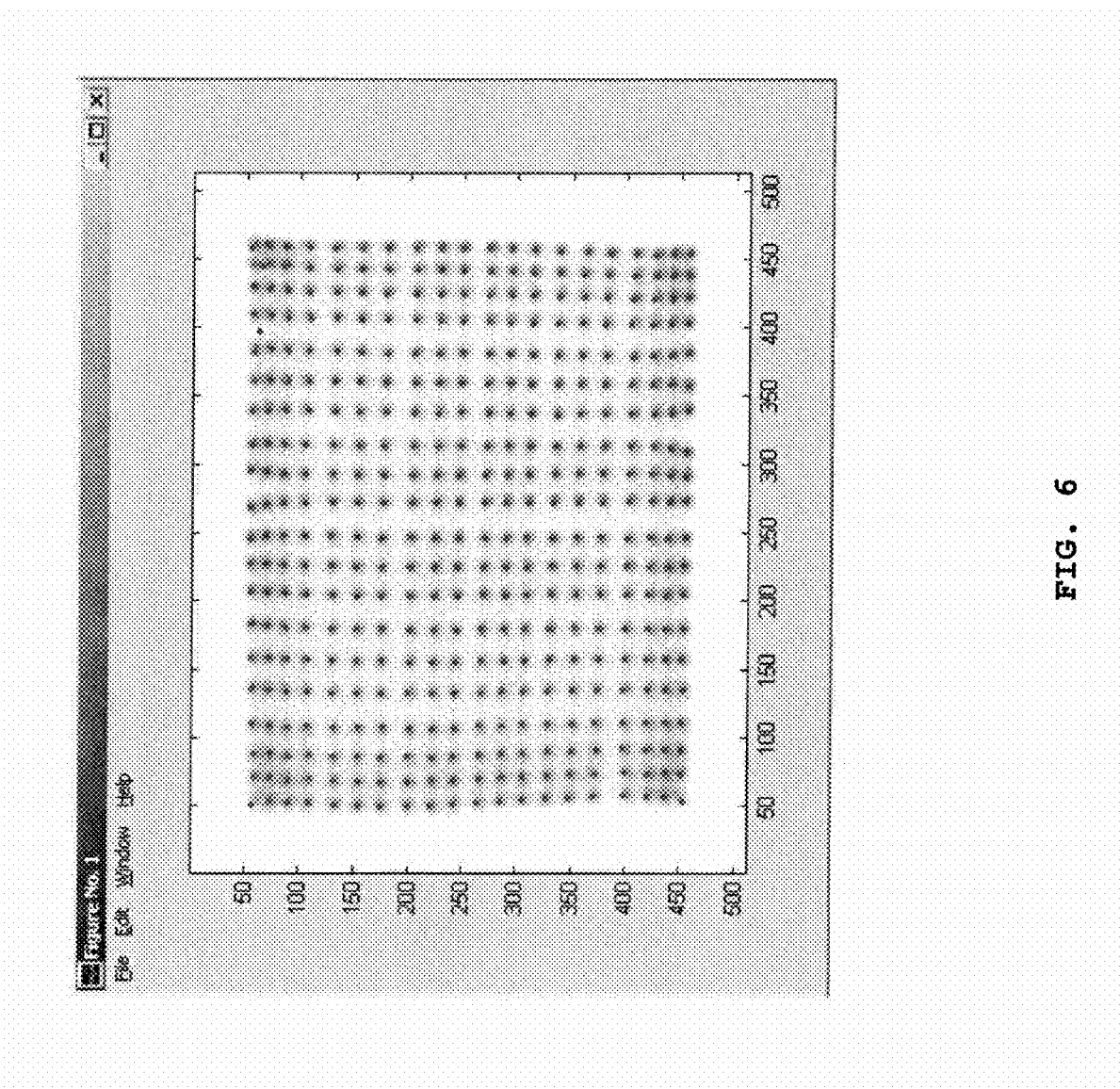
FIG. 6: shows a neuron position profile after network training.

The exemplary trained network is illustrated in FIG. 6. In this exemplary simulation, most of the neurons have "found" the right pixel location. Only two neurons are misplaced among 400 neurons, which yields 99.5% location accuracy. Total training simulation time for three million events is approximately eight hours on a 1.66 GHz, Pentium IV processor-based PC.

Thus, the developed neural network-based algorithm for CLT building produces higher pixel identification accuracy. There are two issues to be addressed in making this algorithm practical on a PET scanner. First, like all competitive networks, dead neuron and stability problems may occur, as apparent in the upper right-hand portion of FIG. 6. This issue can be solved by introducing strong constraints from the grid pixel pattern of the detector structure.

Figure 7:
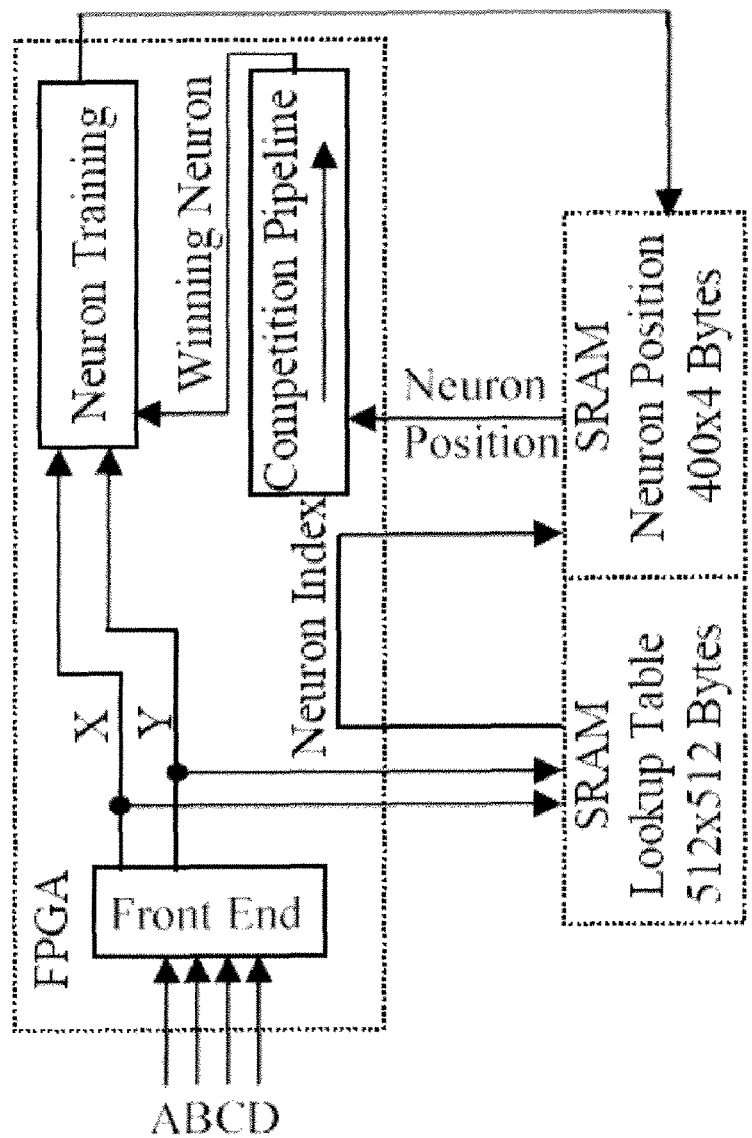
FIG. 7: shows a schematic illustration of the system of the invention implemented on a field programmable gate array (FPGA) device.

Second, the relatively lengthy time to train the system can be overcome by implementing the SOFM algorithm on a field programmable gate array (FPGA) chip within the event processing module (EPM) electronics to accelerate the training process. That makes it possible to build the CLT on-line while the position profile is being acquired and makes the CLT building time comparable to that of the prior art, but with significantly higher accuracy. A schematic illustration of such a system is shown in FIG. 7.

The EPM electronics related to the SOFM training includes a large-scale FPGA chip and several Static Random Access Memory (SRAM) chips. The FPGA implementation consists of a front end module, a SRAM addressing module, a competition pipeline, and a neuron-training module. The total logic utilizes less than 20% of the FPGA resource.

Figure 8:
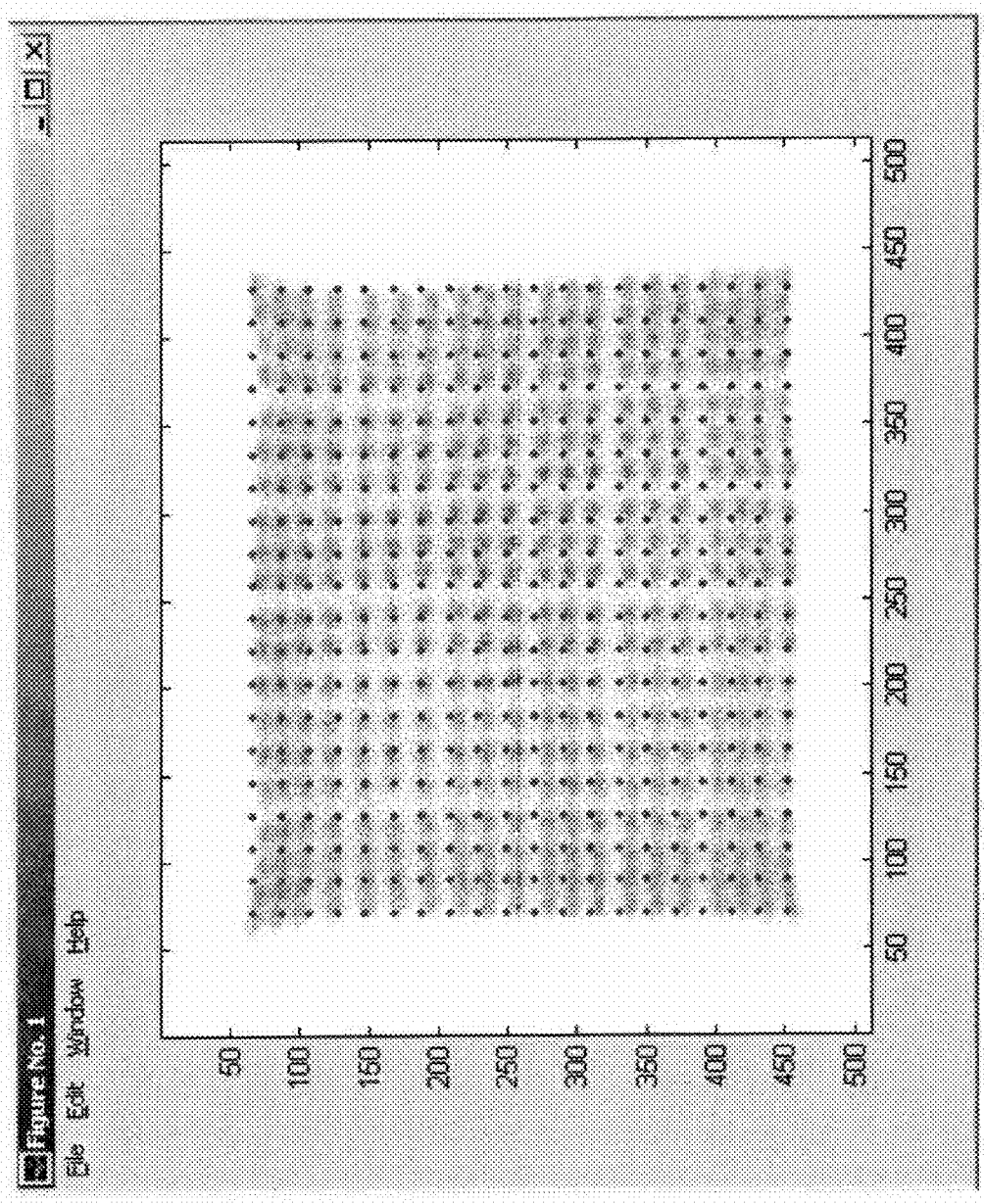
FIG. 8: illustrates the position profile and initial position of neurons in SRAM in the system illustrated in FIG. 7.

A position profile is acquired first with a short period of time. Initial weight vectors of the exemplary 400 neurons based on the position profile are calculated and downloaded to the SRAM before training. The initial neurons are evenly (randomly) distributed in the interested area of the position profile as shown in FIG. 8 and as discussed above. Since multiplication is involved in competition and learning calculations, and integers do not provide enough resolution, a fixed point data format with 9 integer bits and 7 fractional bits is used. Therefore, the X, Y position of each neuron occupies 4 bytes, with a range of 0-512 and resolution of $2^{-7}$.

A lookup table is also generated based on the initial weight vectors of the neurons and stored in the SRAM. The lookup table defines regions indexed by the X, Y value of the event. Only the neurons in the same region (rather than all 400 neurons) compete with each other. The adjacent regions overlap each other to ensure that all necessary neurons are picked up for competition when an event comes in. The lookup table reduces the size of the competitive layer and the pipeline processing time, so the required FPGA resource and processing cycle does not increase with the number of neurons.

When an event triggers, the digitized ABCD values are sampled in the front end and the X, Y position of the event is calculated. The X, Y value is used as an address to retrieve the region number from the lookup table in the SRAM. The positions of all the neurons in the region are read from the SRAM and sent to the competition pipeline sequentially. The FPGA contains multiple 18 bit×18 bit multiplier blocks. Due to the pipeline implementation, only one multiplier is needed. The winner of the competition is the neuron to be updated by the X, Y value of the incoming event using the Kohonen rule. Each time an event happens, only one neuron is updated. The updated neuron is then stored back to the SRAM, and the training logic is ready for the next event. The neurons' positions are uploaded from the SRAM after the training is completed. A CLT is built based on the peak positions represented by the neurons' positions.

Figure 9:
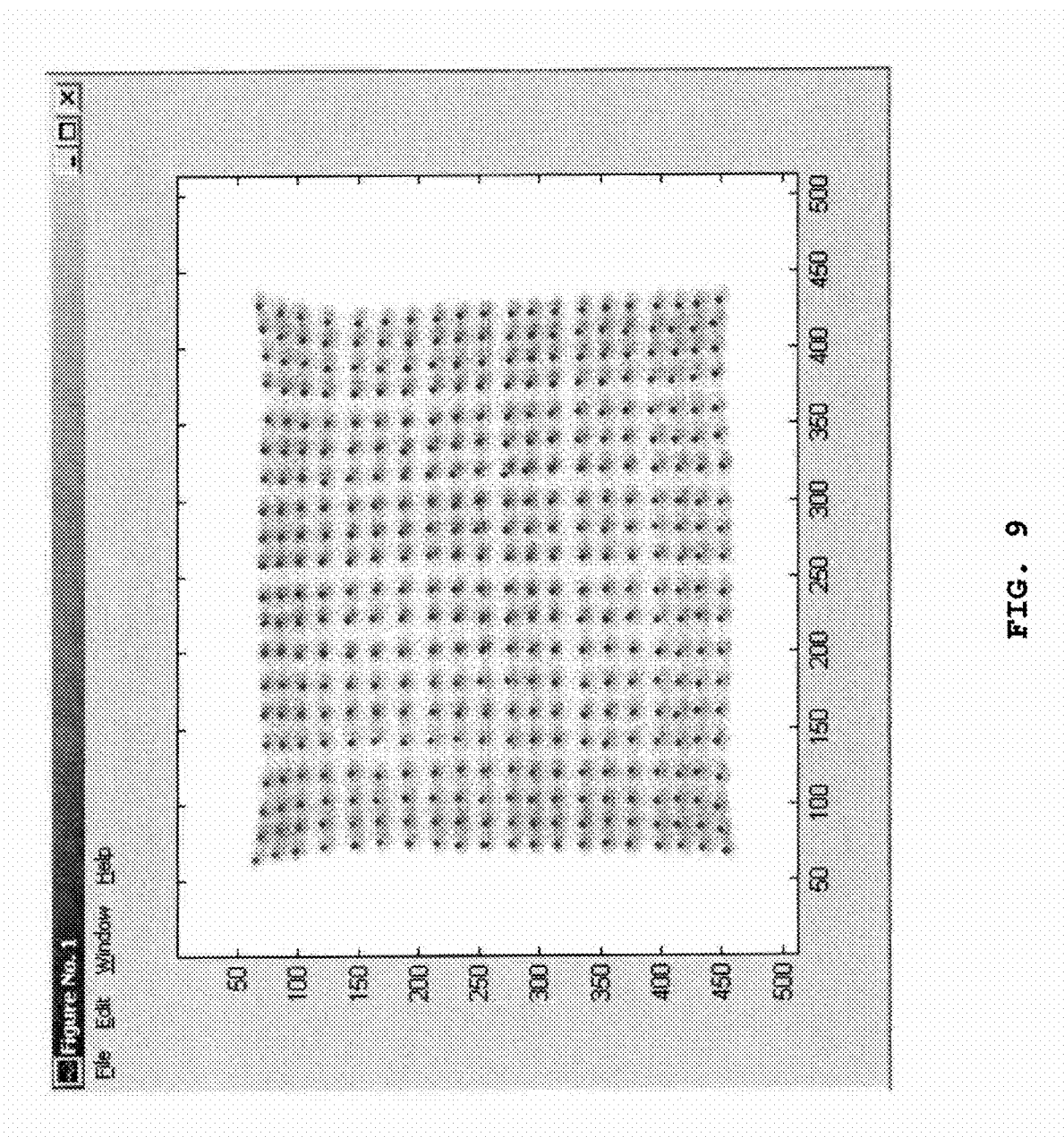
FIG. 9: illustrates the results of training implemented on the FPGA device of FIG. 7.

FIG. 9 illustrates the results of SOFM training performed by FPGA implementation. During training, a 511 keV weak source is placed in front of the detector, and in 3 minutes the SOFM is trained by more than 4.5 million events. The FPGA training logic is running at a clock with a period of 16 ns, and a training cycle only consumes 688 ns. Therefore, if a hot source is used, the training can be accomplished in seconds. In this training, all neurons find their corresponding pixel location; however, some neurons are not located at the center of their corresponding pixel.

As has been observed in simulation, dead neuron and stability problem may occur. In particular, as shown in the Figures, one neuron is oscillating between two pixels while another neuron never wins the competition and is never trained by any incoming events. In FPGA training, some neurons are pulled toward the edge of the pixels due to the noise events in the gap. This implicates the signal-noise ratio that can be tolerated by the algorithm; applying a weighted learning rate based on histogramming can help alleviate such issues. Additionally, using a larger neighborhood size at the beginning of the training may also overcome the dead neuron issue.

Once the neuron is trained to the correct position, it is "trapped" around this location in future training unless the pixel is changed or the tube gains are unbalanced. This feature makes the FPGA implementation a good method for detector on-line monitoring. The logic can be run in parallel with the acquisition logic. When a detector defect happens due to a pixel cracking or tube drifting, it can be detected immediately rather than after image reconstruction.

Figure 2:
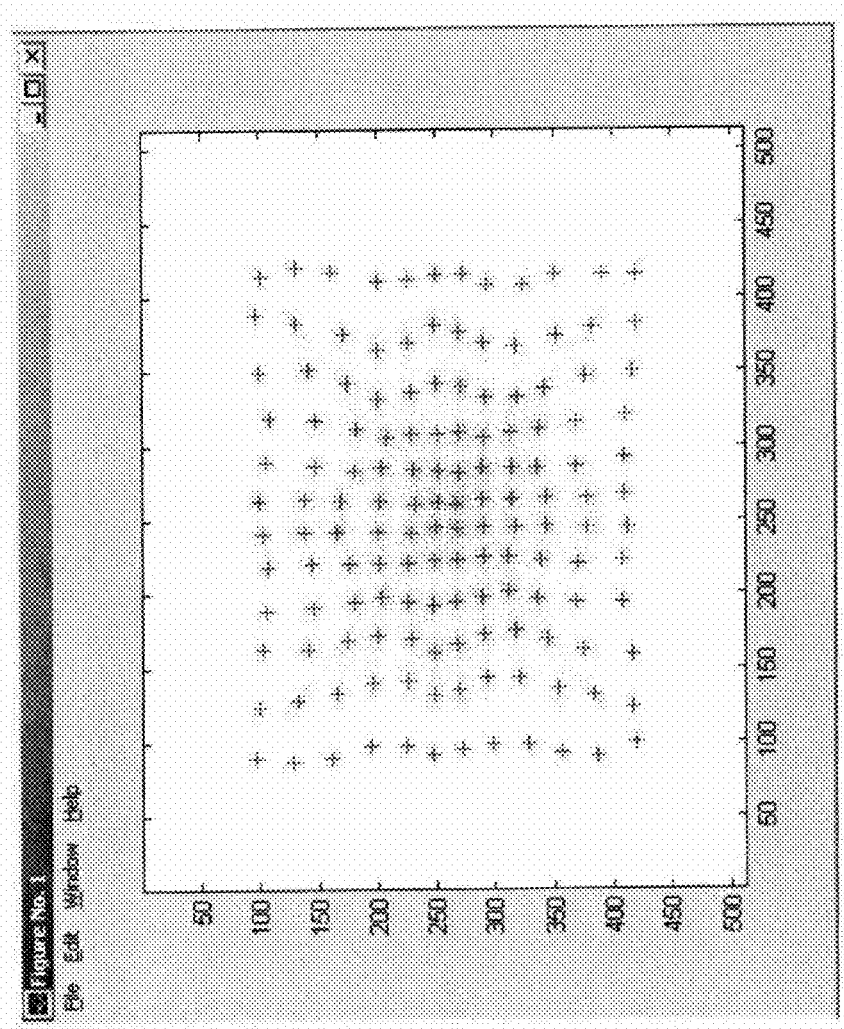
FIG. 2: shows self-organizing feature map (SOFM) training results on an APD detector.

The SOFM for building crystal lookup table on PET detector coupled with photomultiplier tubes (PMTs), as described above, is verified here with APD detector that is featured as low peak-background ratio. Under the neighborhood 1 rule, only the winning neuron is updated using the Kohonen rule, $$w(q)=(1-\alpha)w(q-1)+\alpha p(q)$$

where α is learning rate, q is training index number, p is position vector of incoming event, w is the winning neuron, which has the same dimension of p. As discussed above, this method works well with the Siemens INVEON detector. However, on APD detector, some neurons are pulled toward the edge of the pixels by the noise events in the peak gap, due to the low peak-background ratio. According to the present invention a weighted learning rate based on histogramming count is preferably applied to solve this issue. The Kohonen rule is preferably modified as $$w(q)=(1-\alpha)w(q-1)+\alpha p(q)C$$

where C is the histogramming count at p position. The initial neurons and SOFM training results on an APD detector are shown in FIGS. 1 and 2, respectively. The red crosses indicate the initial or trained positions of neurons. The algorithm is verified through simulation with events acquired from an APD detector. The verification results show that the modified SOFM algorithm achieves excellent crystal identification.

According to the present invention, once the neuron is trained to the correct position, it is preferably trapped around this position in the further training. The algorithm is compact and simple, and can be easily implemented in the FPGA chip, preferably running in parallel to event acquisition. These features of SOFM make it a preferred method for detector real-time crystal peak tracking, according to the present invention. When the APD gains are drifting slowly, the neurons are capable of tracking the crystal positions.

Figure 3:
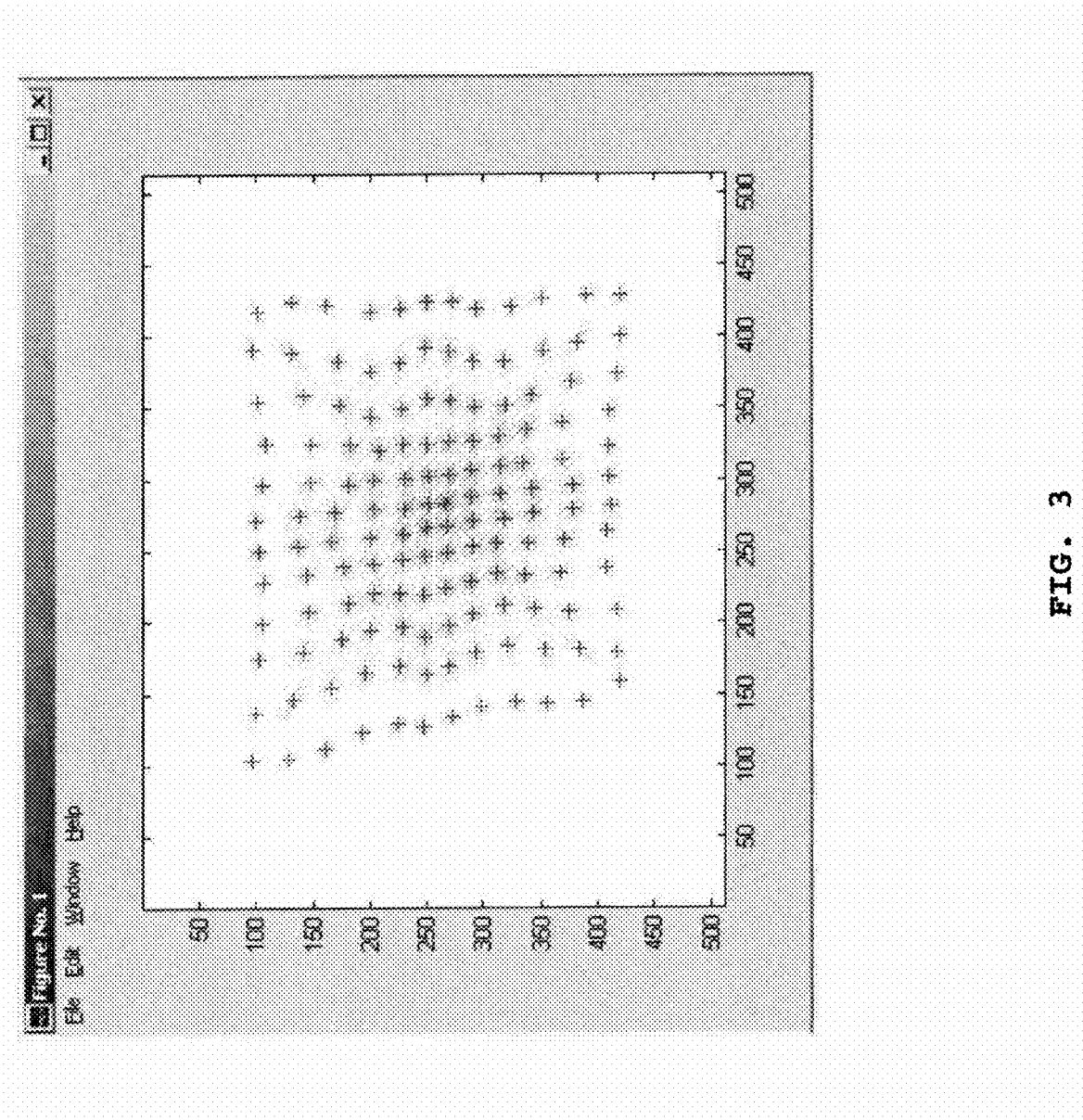
FIG. 3: shows a simulation of real-time crystal peak tracking.

The real-time crystal peak tracking feature of SOFM is verified through simulation. The left-down corner of the position profile in FIG. 2 is pushed to the right slowly to simulate APD gain drifting. The neurons are trained continuously in the meantime. FIG. 3 shows that the neurons follow the crystal changes, which indicates FPGA implementation is an effective method for APD detector crystal peak real-time tracking.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A method for generating a crystal lookup table for use in a nuclear imaging scanner having scintillation detectors with scintillation crystals and photodetectors, comprising:
    generating a block position profile for a multiplicity of events, the block position profile consisting of X and Y position data of said events;
    sequentially reading the X and Y position data of the events in said block position profile;
    inputting the X and Y data for each of said events into a self-organizing feature map as an input vector;
    determining a winning neuron a using a competitive layer;
    updating the weight matrix for all neurons within a predetermined neighborhood to generate pixel locations;
    applying a weighted learning rate based on a histogramming count to compensate for photodetector gain drifting; and
    following system training, constructing a crystal lookup table using the generated pixel locations.

2. The method of claim 1, wherein neuron a=compet (Wp), W is a weight matrix representing neuron positions, and p is the input vector.

3. The method of claim 1, wherein the step of updating is performed according to the rule w(q)=(1−α)w(q−1)+αp(q)C, where α is a predetermined learning rate and q is a training index number, and wherein C is the histogramming count at p position.

4. The method of claim 1, wherein the method is implemented by hardware.

5. The method of claim 4, wherein the method is implemented by a field programmable gate array (FPGA).

6. The method of claim 1, wherein the photodetectors comprise avalanche-photodiodes (APD) and the crystal peak changes in the block position profile caused by APD gain thermal drifting is tracked in real-time.

7. A self-organizing neural network for generating a crystal lookup table for use in a nuclear imaging scanner having scintillation detectors with scintillation crystals and photodetectors, comprising:
    a memory for storing data;
    a processor for processing:
    an input for receiving a block position profile for a multiplicity of events, the block position profile consisting of X and Y position data of said events and converting said profile into input vectors;
    a self-organizing feature map for receiving the X and Y data for each of said events as an input vector; and
    a competitive layer for determining a winning neuron a from said self-organizing feature map, updating the weight matrix for all neurons within a predetermined neighborhood to generate pixel locations, and applying a weighted learning rate based on a histogramming count to compensate for photodetector gain drifting.

8. The self-organizing neural network of claim 7, wherein neuron a=compet (Wp), W is a weight matrix representing neuron positions, and p is the input vector.

9. The self-organizing neural network of claim 7, wherein the step of updating is performed according to the rule w(q)=(1−α)w(q−1)+αp(q)C, where α is a predetermined learning rate and q is a training index number, and wherein C is the histogramming count at p position.

10. The self-organizing neural network of claim 7, wherein the network is implemented on hardware comprising a field programmable gate array (FPGA) device.

11. The self-organizing neural network of claim 7, wherein the photodetectors comprise avalanche-photodiodes (APD) and the crystal peak changes in the block position profile caused by APD gain thermal drifting is tracked in real-time.

* * * * *